No. 663,911. Patented Dec. 18, 1900.
J. A. LEGGATT.
REVOLVING AND ADJUSTABLE DISPLAY TABLE.
(Application filed Apr. 7, 1900.)
(No Model.)
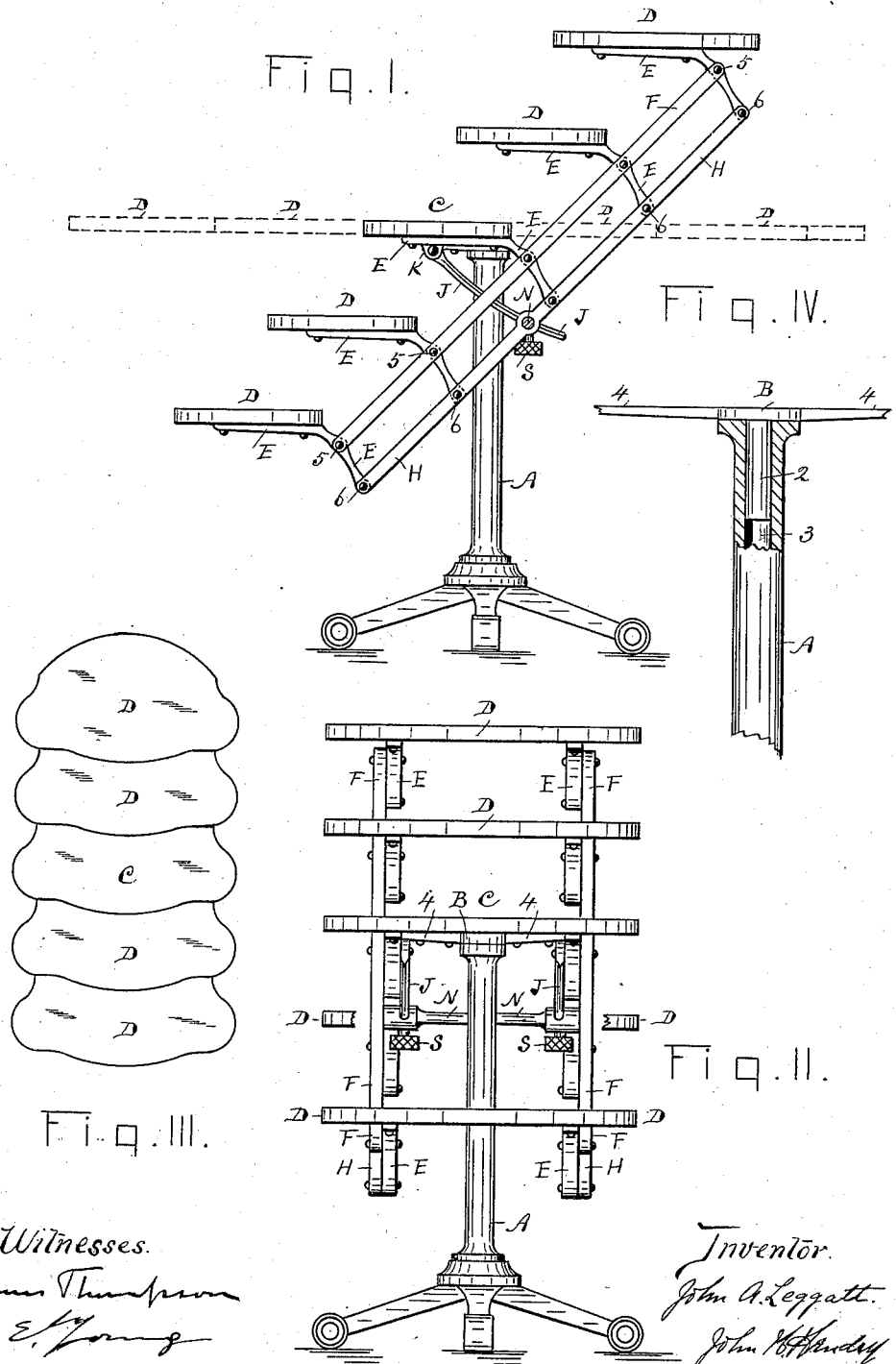
Witnesses.
Inventor.

UNITED STATES PATENT OFFICE.

JOHN A. LEGGATT, OF HAMILTON, CANADA, ASSIGNOR, BY DIRECT AND MESNE ASSIGNMENTS, TO ERNEST E. PEACOCK, OF SAME PLACE.

REVOLVING AND ADJUSTABLE DISPLAY-TABLE.

SPECIFICATION forming part of Letters Patent No. 663,911, dated December 18, 1900.

Application filed April 7, 1900. Serial No. 11,934. (No model.)

*To all whom it may concern:*

Be it known that I, JOHN A. LEGGATT, a citizen of Canada, residing at Hamilton, in the county of Wentworth, in the Province of Ontario, Canada, have invented new and useful Improvements in Revolving and Adjustable Display-Tables, of which the following is a specification.

This invention relates to a table adapted for displaying salable articles; and it consists of a series of leaves one above another and capable of adjustment to project one lower leaf more or less beyond the next upper leaf, the whole capable of being revolved to any desired position.

The objects of my invention are, first, to provide a table consisting of a series of leaves one above another, each lower leaf projecting beyond the one above, with secure fastening for said leaves, and, second, to provide an adjustable table which shall be capable of being revolved independently of its stand and held in desired position. I attain these objects by the mechanism illustrated in the accompanying drawings, in which—

Figure 1 is a side elevation of the table, the leaves adjusted to one of many positions. Fig. 2 is a front elevation of the same. Fig. 3 is a reduced plan of the leaves as they would appear when adjusted to a level table, the edges and the ends of the leaves being shown as having suitable curves one fitting against the other, also the rear edge of the upper leaf being bowed out to the rear. Fig. 4 is an enlarged sectional elevation of the upper part of the table-stand, with vertical socket to receive the shank of the revolving plate, which has side extensions to fasten to the under side of the rigid middle leaf of the table.

Similar characters refer to similar parts throughout the several views.

In the drawings referred to the vertical stand is indicated by A, and the revolving top plate by B. This plate B has a shank 2, which is capable of revolving in the vertical socket 3 of the stand. The revolving plate B has horizontal extensions 4, which secure the plate, with its shank 2, to the under side of the middle leaf C to strengthen and solidify the same, and consequently the other leaves composing the table. This middle leaf, together with the series of upper and lower leaves, which may be designated D, are all provided with metallic brackets E, which are secured to the under side of the leaves a distance in from each end of the leaf. The rear parts of these rigid brackets extend past the rear edges of the leaves and are provided with pivotal centers beyond the leaves, the rear pivotal ones extending downward. All these brackets are similar in construction and are secured to the leaves in conformity with each other, that the said pivotal centers may allow all the pivots of the connected straps to act in unison. The straps F are pivoted to the pivotal centers 5 of the brackets E, and the rear parallel straps H are pivoted to the rear and lower pivotal centers 6 of the brackets. The upper two and the lower two leaves may be adjusted to different relative positions one above the other and all parallel with the stationary and level middle leaf to a position on a plane or level with the stationary leaf, and the whole series of leaves, with their pivoted straps, may revolve on the stationary stand. To lock these upper and lower leaves to an adjusted position in relation to the middle stationary level leaf, curved rods are provided, which are pivoted to lugs K on the middle-leaf brackets E. The rear ends of these rods pass through enlarged parts of the transverse rod N, which is connected to the rear straps H. The hand-screws S through the said enlargements of the rod N secure the curved braces J to the transverse rod N. This rod N is capable of swivel movement conformed and regulated by the movement of the braces J when the table is being adjusted to a different position.

It will be observed that the upper leaf extends rearward beyond its supporting-brackets E to produce a wider top leaf, in order that the table when in horizontal or level position shall be well balanced on the centrally-located stand, and also in this table the sides are entirely open to display the goods from the sides as well as from the front. These open sides are very advantageous and greatly add to the merit of the table for the purpose of displaying the merchandise from three sides, which is a very important element and feature in this invention.

Various changes in the form, construction, and minor details of this invention may be resorted to without departing from the spirit and scope thereof. For instance, the leaves may be of various patterns and designs, the front edge of one leaf conforming to the rear edge of another, as in Fig. 3 of the drawings.

What I claim as my invention, and desire to secure by Letters Patent, is—

1. An adjustable table comprising a series of leaves the middle leaf thereof secured to a stand, metallic brackets secured to the under side of the leaves a distance in from the ends and extending beyond the rear edges and below thereof, straps pivoted to said brackets beyond the rear edges of the leaves, rear straps pivoted to the rear and lower extended parts of said brackets, lugs on the brackets of the middle leaf, a transverse rod with enlarged parts loosely connected to the rear straps, braces pivotally connected to said lugs and extending through the enlarged parts of the transverse rod, said transverse rod capable of swivel movement by the action of said braces, and hand-screws to fasten the braces to the transverse rod, as described.

2. An adjustable table comprising a series of leaves, a centrally-located plate secured to the under side of the middle leaf, a lower vertical shank on said plate, a stand, a vertical socket in the stand to allow said shank to revolve, brackets secured to the under side of the leaves a distance in from the ends and extending beyond the rear edges and below thereof, straps pivotally connected to said brackets beyond the rear edges of the leaves, rear straps pivoted to the rear and lower extended parts of said brackets, lugs on the brackets of the middle leaf, a transverse rod with enlarged parts loosely connected to the rear straps, braces pivotally connected to said lugs and extending through the enlarged parts of the transverse rod, said transverse rod capable of swivel movement by the action of said braces, and hand-screws to fasten the braces to the transverse rod, as described.

In testimony whereof I affix my signature in presence of two witnesses.

JOHN A. LEGGATT.

Witnesses:
 JOHN H. HENDRY,
 CHAS. GOUTLE.